(12) United States Patent
Nam et al.

(10) Patent No.: US 11,270,203 B2
(45) Date of Patent: Mar. 8, 2022

(54) APPARATUS AND METHOD FOR TRAINING NEURAL NETWORK BY PERFORMING NORMALIZATION USING A PLURALITY OF NORMALIZATION TECHNIQUES

(71) Applicant: Lunit Inc., Seoul (KR)

(72) Inventors: Hyeon Seob Nam, Seoul (KR); Hyo Eun Kim, Seoul (KR)

(73) Assignee: LUNIT INC., Seoul (KR)

( * ) Notice: Subject to any disclaimer, the term of this patent is extended or adjusted under 35 U.S.C. 154(b) by 50 days.

(21) Appl. No.: 16/438,776

(22) Filed: Jun. 12, 2019

(65) Prior Publication Data

US 2020/0302286 A1 Sep. 24, 2020

(30) Foreign Application Priority Data

Mar. 19, 2019 (KR) .................. 10-2019-0031099

(51) Int. Cl.
*G06N 3/08* (2006.01)
(52) U.S. Cl.
CPC .................. *G06N 3/08* (2013.01)
(58) Field of Classification Search
CPC ......................................... G06N 3/08
See application file for complete search history.

(56) References Cited

U.S. PATENT DOCUMENTS

| 2015/0278642 | A1* | 10/2015 | Chertok | G06N 3/02 |
| | | | | 382/156 |
| 2017/0185872 | A1* | 6/2017 | Chakraborty | G06K 9/6267 |
| 2019/0325315 | A1* | 10/2019 | Ioffe | G06N 20/00 |
| 2021/0034913 | A1* | 2/2021 | Pan | G06N 3/04 |

FOREIGN PATENT DOCUMENTS

| KR | 10-2017-0108081 | 9/2017 |
| KR | 10-2018-0025093 | 3/2018 |
| KR | 10-2018-0134740 | 12/2018 |

OTHER PUBLICATIONS

Ganin et al., "Unsupervised Domain Adaptation by Backpropagation," Proc. ICML (2015) (Year: 2015).*

(Continued)

*Primary Examiner* — Kakali Chaki
*Assistant Examiner* — Kevin L. Smith
(74) *Attorney, Agent, or Firm* — Lex IP Meister, PLLC

(57) ABSTRACT

There is provided is a method and an apparatus for training a neural network capable of improving the performance of the neural network by performing intelligent normalization according to a target task of the neural network. The method according to some embodiments of the present disclosure includes transforming the output data into first normalized data using a first normalization technique, transforming the output data into second normalized data using a second normalization technique and generating target normalized data by aggregating the first normalized data and the second normalized data based on a learnable parameter. At this time, a rate at which the first normalization data is applied in the target normalization data is adjusted by the learnable parameter so that the intelligent normalization according to the target task can be performed, and the performance of the neural network can be improved.

15 Claims, 19 Drawing Sheets

(56) References Cited

OTHER PUBLICATIONS

Huang et al., "Arbitrary Style Transfer in Real-Time with Adaptive Instance Normalization," IEEE (2017) (Year: 2017).*
Bilen et al., "Universal representations: The missing link between faces, text, planktons, and cat breeds" (2017) (Year: 2017).*
Pan et al., "Two at Once: Enhancing Learning and Generalization Capacities via IBN-Net," ECCV (2018) (Year: 2018).*
Wu et al., "Group Normalization," (2018) (Year: 2018).*
Cao et al., "Extreme Learning Machine with Affine Transformation Inputs in an Activation Function," IIEEE Transactions on Neural Networks and Learning Systems (2018) (Year: 2018).*
Deecke et al., "Mode Normalization," (2018) (Year: 2018).*
Passalis et al., "Deep Adaptive Input Normalization for Price Forecasting using Limit Order Book Data," IEEE Transactions on Neural Networks & Learning Sys. (Feb. 21, 2019) (Year: 2019).*
Luo et al., "Differentiable Learning-to-Normalize via Switchable Normalization," (2018) (Year: 2018).*

Yuxin Wu et al., "Group Normalization", Proceedings of the European Conference on Computer Vision (ECCV). 2018.
Hyeonseob Nam et al., "Batch-Instance Normalization for Adaptively Style-Invariant Neural Networks", 32nd Conference on Neural Information Processing Systems (NeurIPS 2018), Montréal, Canada, May 21, 2018.
Hyeonseob Nam et al., "Batch-Instance Normalization for Adaptively Style-Invariant Neural Networks", Cornell University, Computer Science, May 21, 2018, Abstract only.
Hyeonseob Nam et al., "Batch-Instance Normalization for Adaptively Style-Invariant Neural Networks", Thirty-second Conference on Neural Information Processing Systems, NeurIPS, Dec. 4, 2018, Abstract only.
Xun Huang et al., "Arbitrary Style Transfer in Real-time with Adaptive Instance Normalization", Department of Computer Science & Cornell Tech, Cornell University, Jul. 30, 2017, arXiv:1703.06868v2.

* cited by examiner

| TASK | NORMALIZATION PARAMETER(p) | PERFORMANCE EVALUATION RESULT (accuracy) |
|---|---|---|
| TASK #1 | 0.8 | 88% |
| TASK #2 | 0.4 | 86% |
| TASK #3 | 0.6 | 85% |
| ⋮ | ⋮ | ⋮ |
| TASK #N | 0.9 | 87% |

APPARATUS AND METHOD FOR TRAINING NEURAL NETWORK BY PERFORMING NORMALIZATION USING A PLURALITY OF NORMALIZATION TECHNIQUES

This application claims priority from Korean Patent Application No. 10-2019-0031099 filed on Mar. 19, 2019, in the Korean Intellectual Property Office, the disclosure of which is incorporated herein by reference in its entirety.

BACKGROUND

1. Field of the Disclosure

The present disclosure relates to an apparatus and a method for training a neural network and more particularly, to an apparatus and method for improving performance of a neural network by intelligently performing normalization according to a target task of the neural network in the case of machine learning of the neural network.

2. Description of the Related Art

A neural network is a machine learning model which imitates the neural structure of humans. The neural network is composed of one or more layers, and output data of each layer is used as an input of the next layer. Recently, in-depth research is underway on the use of a deep neural network composed of multiple layers, and deep neural networks play an important role in increasing recognition performance in various fields, such as speech recognition, natural language processing, and lesion diagnosis.

Since a deep neural network includes multiple hidden layers, it is possible to learn various non-linear relationships. However, in the case of training multiple hidden layers, overfitting, the vanishing gradient problem, etc. may occur. To solve such a problem, normalization is frequently used in the machine learning field. In addition to this, normalization is also used for various purposes, such as stabilization of learning and an increase in learning speed.

SUMMARY

Aspects of the present disclosure provide a training method for improving performance of a neural network by performing detailed intelligent normalization according to a target task of the neural network and an apparatus for supporting the method.

Aspects of the present disclosure also provide a training method for performing detailed intelligent normalization even when the relationship between a target task of a neural network and style information is unknown, and an apparatus for supporting the method.

Aspects of the present disclosure also provide a training method for improving performance of a neural network by performing detailed intelligent normalization depending on channels of feature maps or layers of the neural network, and an apparatus for supporting the method.

Aspects of the present disclosure also provide a training method for improving performance of neural network by performing detailed intelligent normalization according to a type of style information included in an image set, and an apparatus for supporting the method.

Aspects of the present disclosure also provide a normalization method which is universally applicable regardless of a type of style information contained in an image or a target task of a neural network, and an apparatus for supporting the method.

It should be noted that objects of the present disclosure are not limited to the above-described objects, and other objects of the present disclosure will be apparent to those skilled in the art from the following descriptions.

According to an aspect of the present disclosure, there is provided a method of training a neural network comprising obtaining output data of a first layer of the neural network regarding a training sample, transforming the output data into first normalized data using a first normalization technique, transforming the output data into second normalized data using a second normalization technique, generating third normalized data by aggregating the first normalized data and the second normalized data based on a learnable parameter and providing the third normalized data as an input to a second layer of the neural network.

According to another aspect of the present disclosure, there is provided an apparatus for training a neural network comprising a memory configured to store one or more instructions and a processor configured to, by executing the stored one or more instructions, obtain output data of a first layer of the neural network regarding a training sample, transform the output data into first normalized data using a first normalization technique, transform the output data into second normalized data using a second normalization technique, aggregate the first normalized data and the second normalized data into third normalized data based on a learnable parameter, and provide the third normalized data as an input to a second layer of the neural network.

BRIEF DESCRIPTION OF THE DRAWINGS

The above and other aspects and features of the present disclosure will become more apparent by describing in detail exemplary embodiments thereof with reference to the attached drawings, in which:

FIG. 9 is an exemplary table that may be referred to in various embodiments of the present disclosure;

DETAILED DESCRIPTION OF THE EMBODIMENTS

Figure 1:
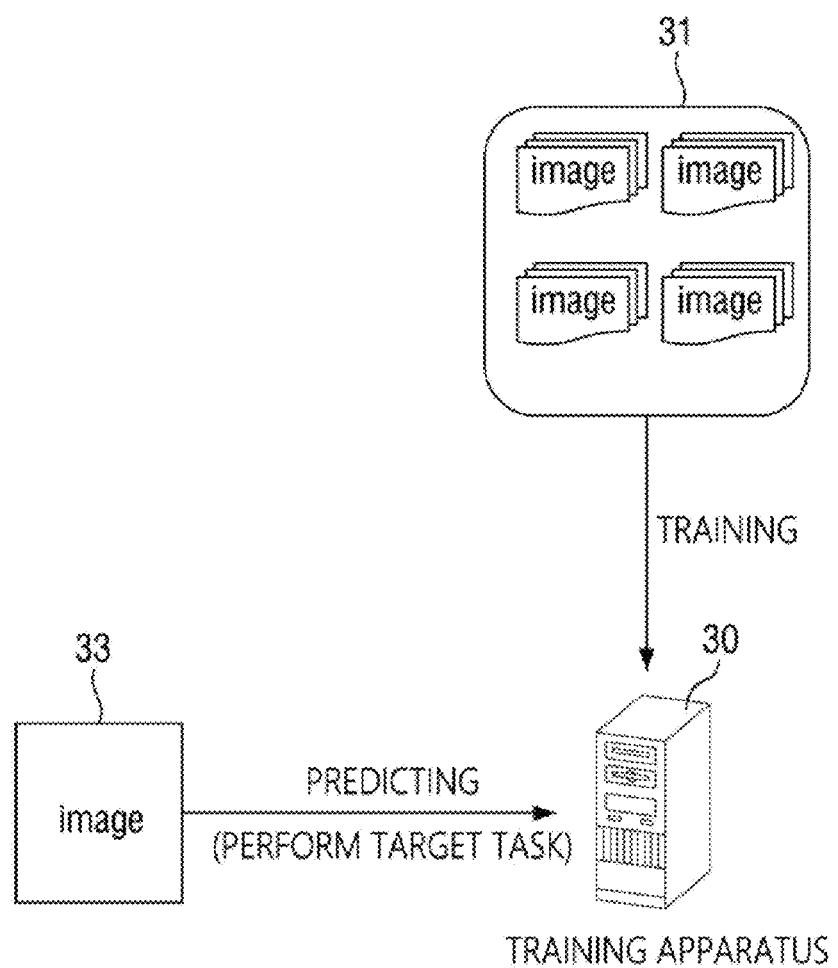
FIG. 1 is a diagram illustrating an apparatus for training a neural network and a training environment thereof according to some embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Before description of this specification, some terms used herein will be clarified.

As used herein, the term "task" refers to an assignment to be solved through machine learning or a work to be done through machine learning. As an example, in the case of performing face recognition, facial expression recognition, sex classification, pose classification, etc. from face information, each of face recognition, facial expression recognition, sex classification, and pose classification may correspond to an individual task. As another example, in the case of performing recognition, classification, prediction, etc. on an abnormality from medical image data, each of abnormality recognition, abnormality classification, and abnormality prediction may correspond to an individual task. A task may also be referred to as a target task.

As used herein, the term "neural network" encompasses any kind of machine learning model which imitates a neural structure. For example, the neural network may include any kind of neural network-based model, such as an artificial neural network (ANN) and a convolutional neural network (CNN).

As used herein, the term "instruction" refers to a series of computer-readable commands which are bound based on functionality. The instruction is an element of a computer program and executed by a processor.

Hereinafter, some embodiments of the present disclosure will be described in detail with reference to the accompanying drawings.

FIG. 1 exemplifies an apparatus 30 for training a neural network and a training environment according to some embodiments of the present disclosure.

As shown in FIG. 1, the apparatus 30 for training a neural network is a computing device which performs machine learning of a neural network to execute a target task. In particular, FIG. 1 shows a case in which the target task is a task related to an image (e.g., object recognition) as an example, but the technical scope of the present disclosure is not limited to a type of task or neural network. For convenience of description, the apparatus 30 for training a neural network is referred to as "training apparatus 30."

Figure 19:
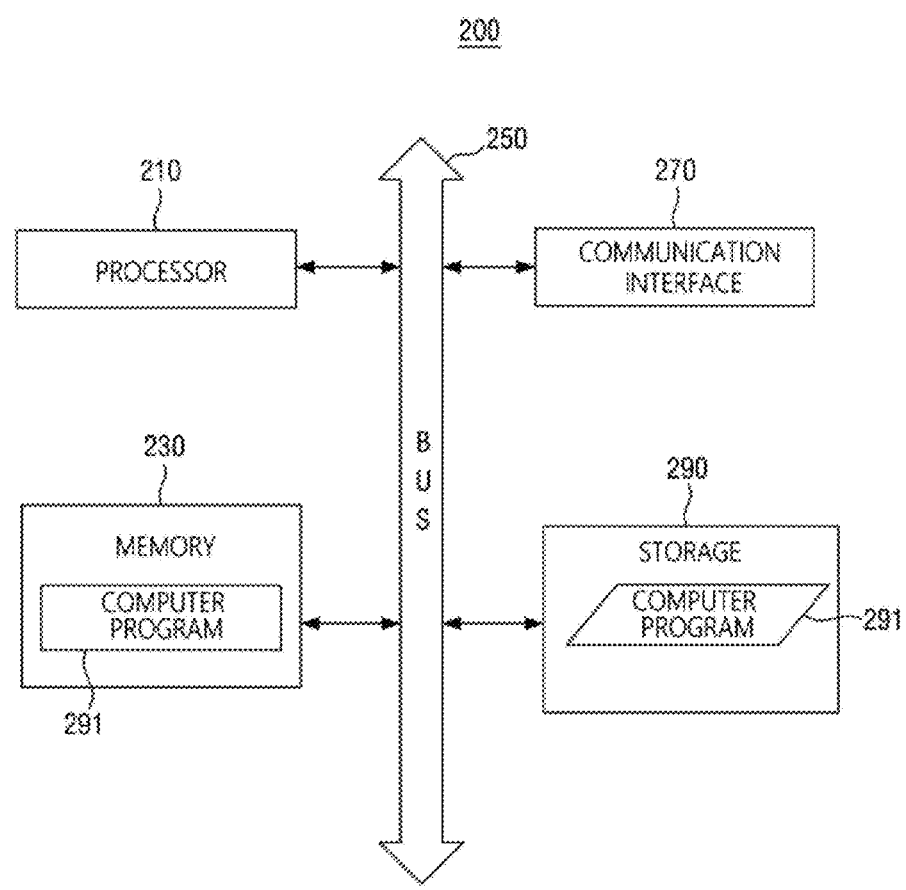
FIG. 19 shows an exemplary computing device for implementing an apparatus according to various embodiments of the present disclosure.

The computing device may be a tablet computer, a desktop computer, a laptop computer, a server, and the like. However, the computing device is not limited thereto and may include any kind of device having a computing function. An example of the computing device is shown in FIG. 19.

Although FIG. 1 shows the training apparatus 30 implemented as one computing device by way of example, in an actual physical environment, a first function of the training apparatus 30 may be implemented by a first computing device, and a second function of the training apparatus 30 may be implemented by a second computing device. Also, the training apparatus 30 may be composed of a plurality of computing devices, and the plurality of computing devices may separately implement first and second functions.

As shown in FIG. 1, the training apparatus 30 may train a neural network (e.g., a CNN) using a data set 31 composed of a plurality of training samples. The neural network may be composed of a plurality of layers, and at least some of the plurality of layers may include a normalization layer which normalizes input (or output) data of the neural network. Also, the training apparatus 30 may enhance training effects of the neural network by performing detailed intelligent normalization through the normalization layer. A training sample may indicate a data unit for training and may include various kinds of data. For example, a training sample may be one image and may include various kinds of data in addition to the image according to a training target or a task.

The training apparatus 30 according to various embodiments of the present disclosure may perform various kinds of normalization. For example, the training apparatus 30 may selectively perform a plurality of normalization techniques. The plurality of normalization techniques may include batch normalization, instance normalization, group normalization, layer normalization, and the like. However, the plurality of normalization techniques are not limited thereto and may further include other normalization techniques.

Figure 2:
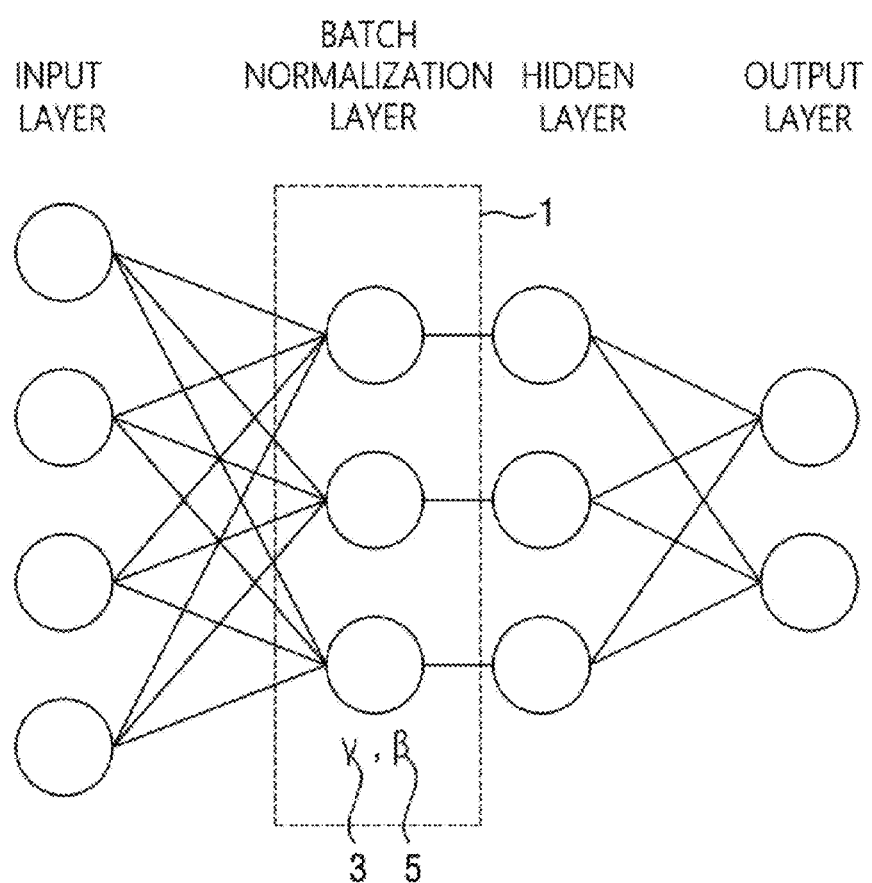
FIGS. 2 and 3 are diagrams illustrating a batch normalization technique.
Figure 3:
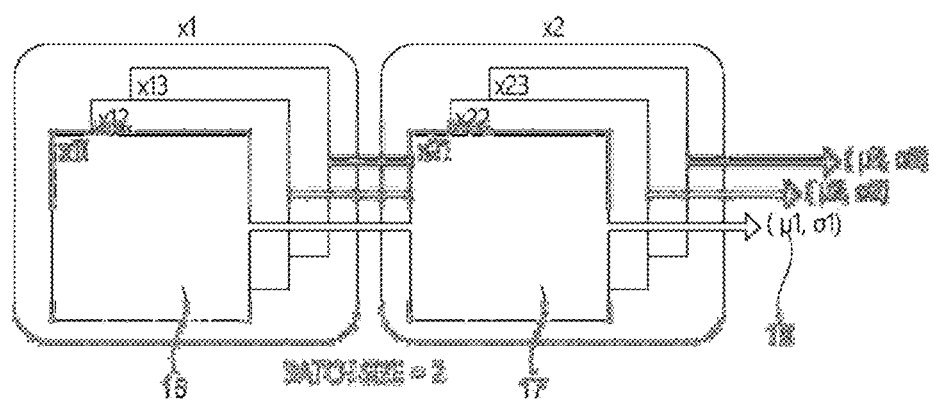
Figure 4:
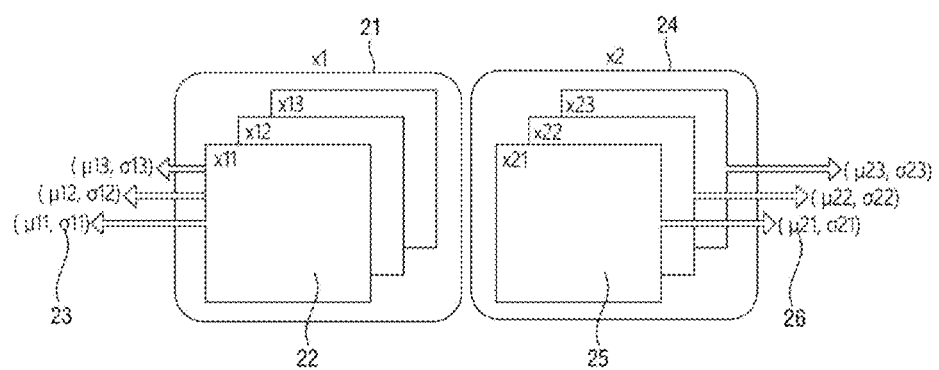
FIG. 4 is a diagram illustrating an instance normalization technique.

The batch normalization technique is illustrated in FIGS. 2 and 3.

As shown in FIG. 2, according to the batch normalization technique, a batch normalization layer 1 interposed between specific layers normalizes output data of a previous layer and performs an affine transformation using learnable parameters 3 and 5. The normalization is performed based on statistical information (e.g., a mean and a standard deviation) of a batch. For example, as shown in FIG. 3, it is assumed that a batch size is 2 and feature maps (e.g., 15 and 17) related to two training samples $x_1$ and $x_2$ are in the batch. In this case, each of the feature maps (e.g., 15 and 17) may be normalized with statistical information 19 of the feature maps (e.g., 15 and 17). Details of the batch normalization technique are disclosed in Korean Unexamined Patent Application Publication No. 10-2017-0108081.

Next, according to the instance normalization technique, normalization is performed based on statistical information of each individual instance. The instance normalization technique is similar to the batch normalization technique of a case in which a batch size is set to 1. For example, it is assumed that there are feature maps 21 and 24 related to two training samples $x_1$ and $x_2$. In this case, when the instance normalization technique is used, a first feature map 22 may be normalized with statistical information 23 of the first feature map 22, and a second feature map 25 may be normalized with statistical information 26 of the second feature map 25.

While the batch normalization technique and the instance normalization technique are used for similar purposes, effects thereof are clearly distinguished from each other in terms of style information.

For example, information represented by an image which is a target of the batch normalization technique and the instance normalization technique is generally classified into content and a style. As an exemplary embodiment, the content may be information related to shapes of objects included in the image, and the style may be information related to texture included in the image. As a detailed embodiment, in the case of distinguishing between a chair and a desk, object shapes may correspond to the content, and object texture such as material, pattern, and color may correspond to the texture.

In other words, an image may be composed of spatial information and style information. For example, the spatial information may be object shapes, and the style information may be texture. The style information may be information irrespective of a spatial configuration. Therefore, the spatial information may be information corresponding to the above-described content.

According to the batch normalization technique, even when normalization is performed, style information (e.g., a mean, a variance, and a standard deviation) of an image may be preserved. This is because there is a small bias in statistical batch information when a batch size is sufficiently large. On the other hand, according to the instance normalization technique, statistical information of individual instances is used. Therefore, style information of each image is completely lost as normalization is performed.

In the case of a task (e.g., object classification) of a general image recognition field, the diversity of styles contained in an image set frequently work as a hindrance factor for learning. For example, in the case of training a neural network to detect a lesion in an X-ray image, a difference in the brightness, sharpness, etc. of X-ray images caused by the diversity of image capturing equipment may make it difficult to train the neural network.

However, in the case of recognizing a specific image, style information may play an important role. For example, in the case of recognizing the weather or the time from an image, style information such as the brightness and sharpness of the image may be important clues for recognizing the weather or the time.

Therefore, in order to ensure performance of the neural network, it is very important to select an appropriate normalization technique according to the relationship between a target task and style information contained in an image. However, it is difficult to know the relationship between style information and a target task of a neural network, and the relationship may not be uniformly determined. For example, while it may be important to preserve style information for some feature maps, it may be better to lose style information for some other feature maps so as to improve performance of the neural network. Therefore, it is necessary to devise a method of automatically and intelligently performing normalization according to a target task of a neural network.

The technical idea of the present disclosure has been devised based on such a necessity. According to various embodiments of the present disclosure, the training apparatus 30 or a normalization layer may perform intelligent normalization using a plurality of normalization techniques according to a target task of a neural network. This is described in detail below.

According to various embodiments of the present disclosure, when there is a strong relationship between the target task of the neural network and style information of an image (i.e., when the style information is required to perform the target task), a normalization layer may perform normalization by mainly using the batch normalization technique. On the contrary, when there is a weak relationship between the target task of the neural network and style information of an image (i.e., when the style information hinders the target task from being performed), a normalization layer according to various embodiments of the present disclosure may perform normalization by mainly using the instance normalization technique. Such an operation of the normalization layer may be automatically controlled through a learnable normalization parameter. This will be described in detail below with reference to FIG. 5 and the subsequent drawings.

After training is sufficiently performed, the training apparatus 30 may perform the target task using the neural network. For example, the training apparatus 30 may provide prediction results based on prediction values (e.g., class-specific confidence scores) obtained by inputting an actual image 33 to the neural network.

The training apparatus 30 and a training environment thereof according to some embodiments of the present disclosure have been described above with reference to FIGS. 1 to 4. A method of training a neural network according to various embodiments of the present disclosure is described below.

Each operation of methods which are described below may be performed by a computing device. In other words, each operation of the methods may be implemented as one or more instructions which are executed by a processor of the computing device. Although all operations included in the methods may be executed by one physical computing device, first operations of the methods may be performed by a first computing device, and second operations of the methods may be performed by a second computing device. Assuming that each operation of the methods is performed by the training apparatus 30, the methods are described below. Therefore, when a subject of a specific operation is omitted in the following description, the corresponding operation may be considered to be performed by the exemplary apparatus. Also, in the methods to be described below, an execution sequence of operations may be changed as necessary as long as the sequence is logically changed.

Figure 5:
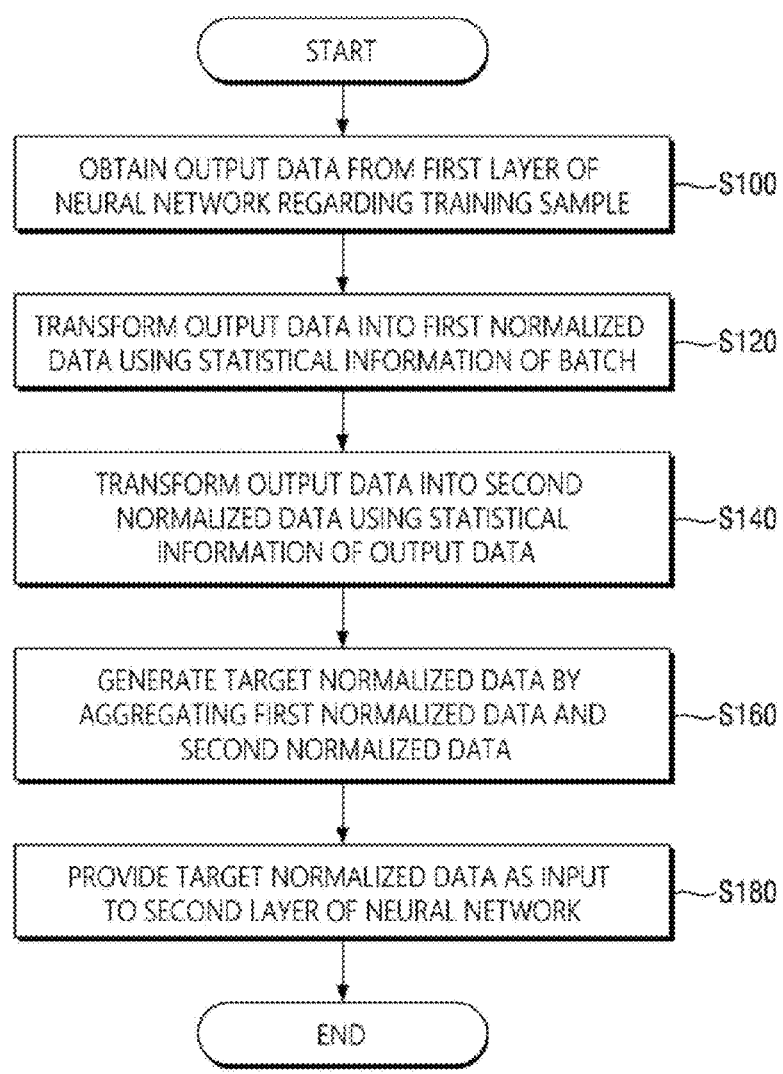
FIG. 5 is an exemplary flowchart showing a method of training a neural network according to some embodiments of the present disclosure.

FIG. 5 is an exemplary flowchart showing a method of training a neural network according to some embodiments of the present disclosure. In particular, FIG. 5 mainly exemplifies a normalization operation in a learning (or training) process of a neural network. The flowchart shown in FIG. 5 is merely intended to illustrate an exemplary embodiment for achieving an object of the present disclosure, and some operations may be added or removed as necessary.

As shown in FIG. 5, the method of training a neural network begins with operation S100 of acquiring output data regarding training samples from a first layer. For example, referring to a neural network 40 shown in FIG. 6, the first layer may correspond to one layer #k 41 among a plurality of layers constituting the neural network 40. Also, operation S100 and operations S120 to S180 to be described below may be considered to be performed in a normalization layer 42. Also, a second layer to be described below may correspond to a layer #k+1 43. In this operation S100, as training samples 44 are input to the neural network 40 and forwarded, the normalization layer 42 may obtain output data of the previous layer 41.

In operation S120, the output data is transformed into first normalized data with statistical information of a batch to which the training samples 44 belong. In other words, the output data is transformed into the first normalized data through the batch normalization technique. The batch normalization technique may be considered to include no affine transformation but may include an affine transformation according to exemplary embodiments.

The statistical information of the batch is statistical information of output data of a plurality of training samples belonging to the batch and may include any information used for normalization such as a mean and a standard deviation.

In operation S140, the output data is transformed into second normalized data using the statistical information of the output data. In other words, the output data is transformed into the second normalized data through the instance normalization technique. The instance normalization technique may be considered to include no affine transformation but may include an affine transformation according to exemplary embodiments.

The statistical information of the output data may be statistical information of the output data itself (i.e., one instance). For example, when the output data is a feature map including a plurality of feature values, the statistical information may be information related to various statistics of the plurality of feature values and may include a mean and a standard deviation.

For reference, FIG. 5 shows an example in which operation S120 and operation S140 are performed in sequence, but operation S120 and operation S140 may be performed in the reverse order or concurrently.

Figure 7:
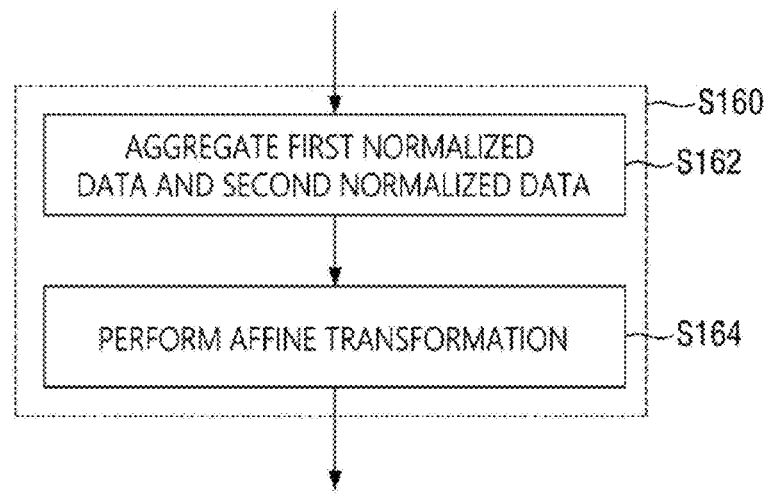
FIGS. 7 and 8 are diagrams illustrating a detailed process of a normalized data generation operation S160 shown in FIG. 5.

In operation S160, target normalized data may be generated based on the first normalized data and the second normalized data. A detailed process of operation S160 is shown in FIG. 7. As shown in FIG. 7, the first normalized data and the second normalized data are aggregated into third normalized data (S162), and the target normalized data may be generated by performing an affine transformation on the third normalized data (S164).

According to various embodiments of the present disclosure, normalization parameters may be used to generate the target normalized data. The normalization parameters may include a first normalization parameter for adjusting application rates of the first normalized data and the second normalized data, a second normalization parameter for adjusting a scale in an affine transformation, and a third normalization parameter for adjusting a shift. More specifically, in operation S162 described above, the first normalization parameter may be used to adjust the rates at which the first normalized data and the second normalized data are applied to the third normalized data. Also, the second and third normalization parameters may be used to perform the affine transformation in operation S164 described above.

All the normalization parameters are learnable parameters (i.e., parameters learned when a neural network is trained) and may be learned when a neural network is trained. In detail, referring back to FIG. 6, when errors 46 between correct answers to the training samples 44 and prediction values 45 are backpropagated to update weight parameters (e.g., 47 and 49) of the neural network 40, a value of a normalization parameter 48 may be updated simultaneously.

In some embodiments, the application rate of the first normalized data and the application rate of the second normalized data may be adjusted together by one normalization parameter (i.e., the first normalization parameter). In other words, in terms of preserving style information of input training samples, the contradictory relationship between the batch normalization technique and the instance normalization technique may be taken into consideration. Therefore, according to an exemplary embodiment of the present disclosure, application rates of two pieces of normalized data may be adjusted by one normalization parameter. For example, when the application rate of the first normalized data is increased by one normalization parameter, the application rate of the second normalized data, which is other normalized data, may be reduced (see Equation 1 below).

In some other embodiments, the application rates of the first normalized data and the second normalized data may be adjusted by different parameters. In other words, separate normalization parameters may be defined for the respective normalization techniques. In this case, a rate at which the first normalized data is applied to the third normalized data may be adjusted by a first parameter, and a rate at which the second normalized data is applied to the third normalized data may be adjusted by a second parameter. The first parameter and the second parameter may be learned when the neural network 40 is trained. When the target task requires neither content information nor style information, both the first parameter and the second parameter may be learned as 0. Also, both the first parameter and the second parameter may be learned as 1. In this case, the batch normalization technique and the instance normalization technique are used together, and accordingly, the neural network 40 may be trained to emphasize content of the training samples 44. In some embodiments, normalization parameters may also be defined depending on channels. In this case, when the target task requires neither content information nor style information of a specific channel, parameters of the specific channel may be learned as 0. Therefore, the neural network 40 may learn the importance of each channel. Also, the importance of each channel may be learned. On the other hand, all parameters of a specific channel may be learned as 1. In this case, the neural network 40 may be trained to further emphasize content of the specific channel.

In brief, in operation S160, the target normalized data for the output data of the first layer may be calculated by aggregating the first normalized data calculated through batch normalization and the second normalized data calculated through instance normalization and performing an affine transformation on the result. This may be represented as shown in Equation 1 below and may be conceptually depicted as shown in FIG. 8.

$$y=(\rho \cdot \hat{x}^{(B)}+(1-\rho) \cdot \hat{x}^{(I)}) \cdot \gamma+\beta \qquad \text{[Equation 1]}$$

In Equation 1, $\hat{x}^{(B)}$ and $\hat{x}^{(I)}$ are the first normalized data calculated through batch normalization and the second normalized data calculated through instance normalization, respectively. $\rho$ may be a first normalization parameter for adjusting an application rate of normalized data, and $\gamma$ may be a second normalization parameter for adjusting a scale. $\beta$ may be a third normalization parameter for adjusting a shift. $\rho$ may be a value between 0 and 1.

Figure 8:
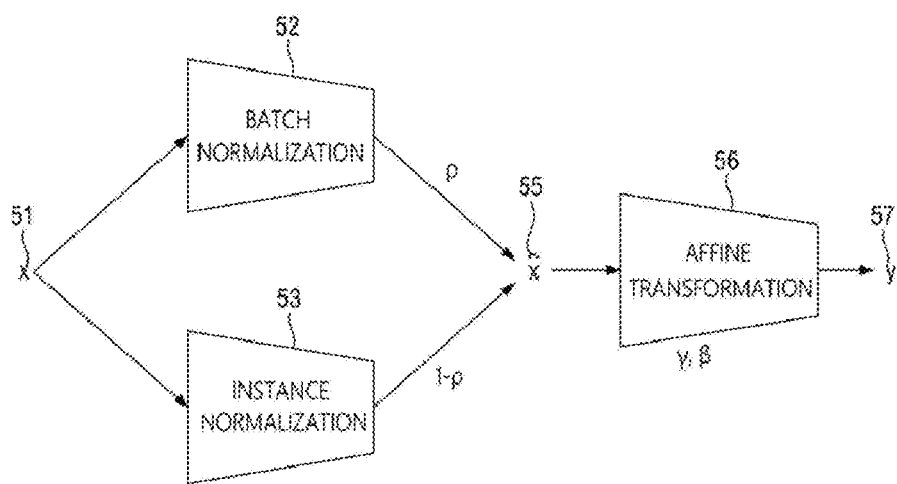

Referring to FIG. 8, x 51 is output data of a previous layer regarding a specific training sample. $\hat{x}$ 55 is third normalized data obtained by aggregating first normalized data calculated through batch normalization 52 and second normalized data calculated through instance normalization 53. As described above, the two pieces of normalized data may be aggregated by the first normalization parameter $\rho$. y 57 is target normalized data generated by performing an affine transformation 56 on the aggregated normalized data 55.

Referring back to FIG. 5, the method is continuously described.

Figure 6:
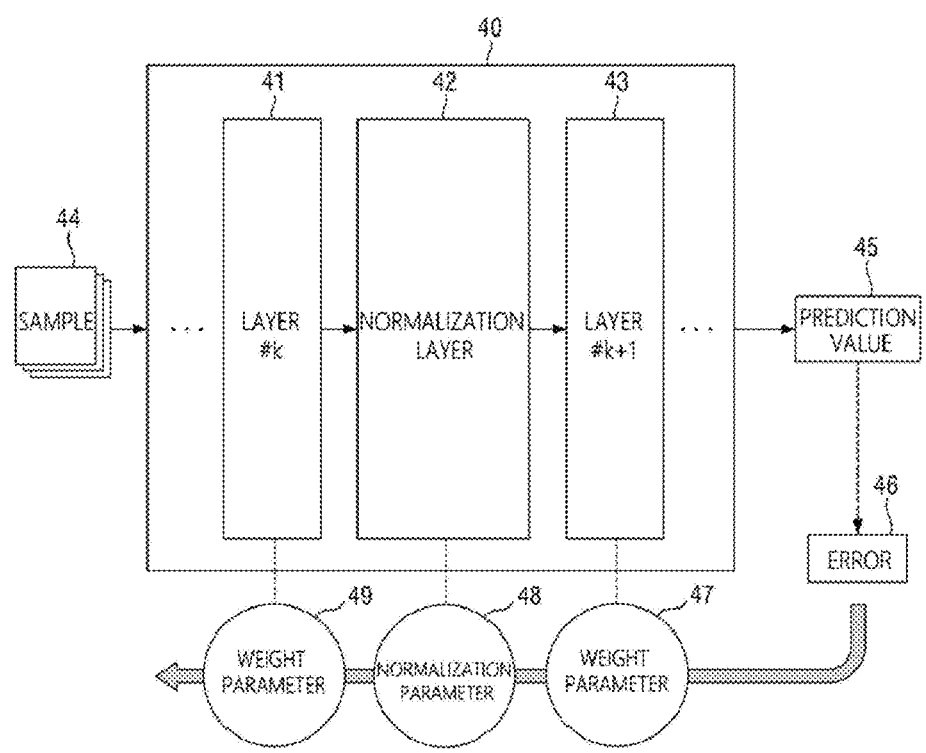
FIG. 6 is an exemplary diagram illustrating a structure and a normalization layer of a neural network that may be referred to in various embodiments of the present disclosure.

In operation S180, the target normalized data regarding the output data of the first layer is provided as an input to the second layer of the neural network 40. Referring to FIG. 6, in operation S180, the target normalized data generated through the normalization layer 42 may be input as an input to a next layer 43. Also, the target normalized data may be forwarded through the layer 43 and used to calculate the prediction errors 46 regarding the training samples 44. Further, the prediction errors 46 may be backpropagated to the neural network 40 and used to update values of the normalization parameter 48 and the weight parameters (e.g., 47 and 49) of the neural network 40.

A process in which one normalization layer normalizes output data of a previous layer and provides the normalized data as an input to the next layer has been described in detail above. When there are a plurality of normalization layers, the above-described operations may be considered to be performed in each normalization layer. In this case, the respective normalization layers may perform normalization using separate normalization parameters. However, in some other embodiments, at least some normalization parameters may be shared among a plurality of normalization layers.

According to some embodiments of the present disclosure, an initial value of the normalization parameter p may be automatically set based on a target task of a neural network. For example, when the target task requires style information, the initial value of the normalization parameter may be set to a value close to 1 (i.e., a value at which the batch normalization technique is mainly used). In the opposite case, the initial value of the normalization parameter may be set to a value close to 0 (i.e., a value at which the instance normalization technique is mainly used). This is because it is possible to cause the normalization parameter to rapidly converge to an optimum value and increase the learning speed of the neural network.

According to some embodiments of the present disclosure, a batch size may be automatically set or changed based on a target task of a neural network. For example, when the target task requires style information, the batch size may be set to a sufficiently large value (e.g., a value greater than or equal to a reference value). This is because it is possible to preserve style information better and improve performance of the neural network.

According to some exemplary embodiments, an initial value of the normalization parameter p may be determined based on a training history. As shown in a table 60 of FIG. 9, the training history may include types of tasks, a mean of learned normalization parameters, performance evaluation results, and the like. However, the training history is not limited thereto and may further include other information. In this exemplary embodiment, when the target task is present in the training history, the initial value may be set to a normalization parameter value in the training history. On the other hand, when the target task is not present in the training history, the initial value may be set based on a normalization parameter value of a task similar to the target task in the training history. In this case, the initial value may be appropriately adjusted according to the similarity between the tasks. Alternatively, the initial value may be set based on a normalization parameter value of a task dissimilar from the target task in the training history. In this case, likewise, the initial value may be appropriately adjusted according to the dissimilarity between the tasks.

According to some embodiments, a batch size may be adjusted according to a value of the normalization parameter $\rho$. For example, when the value of the normalization parameter approximates to 1, the batch size may be adjusted to a greater value. This is because style information may be preserved better when the batch size is increased.

The method of training a neural network according to some embodiments of the present disclosure has been described above with reference to FIGS. 5 to 9. According to the above-described method, a usage rate of each normalization technique is determined by the learnable normalization parameter $\rho$. Therefore, detailed and intelligent normalization may be performed according to a target task and a type of style information, and performance of a neural network may be improved. For example, when style information is not required to perform a target task, the normalization parameter p may be learned as a value close to 0 such that style information may be removed. In the opposite case, the normalization parameter $\rho$ may be learned as a value close to 1 such that style information may be preserved.

Since a usage rate of each normalization technique is automatically adjusted by a neural network, expert knowledge or intervention of a user is not required. In other words, even when it is not possible to recognize or clearly see the relationship between a target task and style information, optimal normalization may be performed by a neural network. Therefore, the normalization method proposed in the present disclosure may be universally used regardless of a target task or style information contained in an image.

To aid in understanding the present disclosure, the technical idea of the present disclosure is described in further detail below with an example in which a training-target neural network is implemented based on a CNN. However, those of ordinary skill in the art will appreciate that the technical idea or exemplary embodiments described below may be readily applied to other types of neural networks. Descriptions are provided below with reference to FIGS. 10 to 14.

Figure 10:
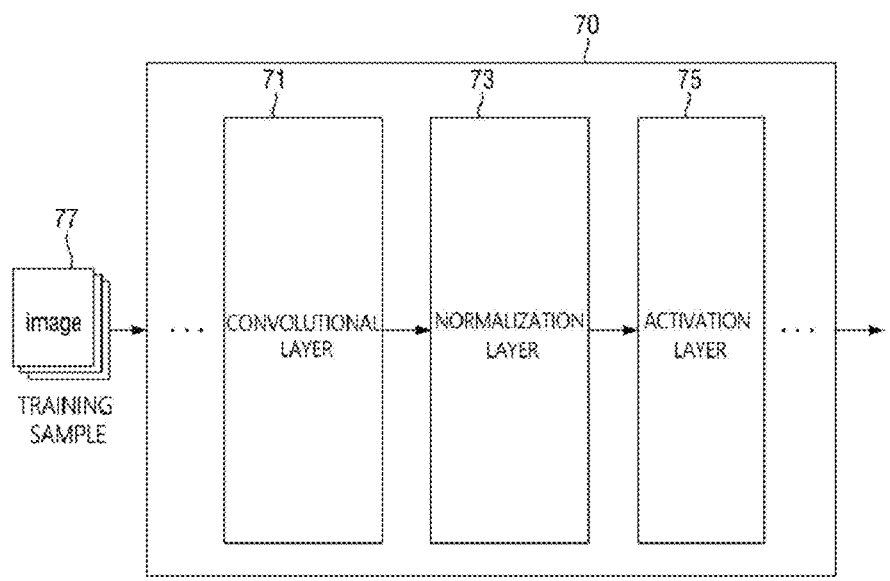
FIG. 10 is an exemplary diagram illustrating a structure and a normalization layer of a convolutional neural network (CNN) that may be referred to in various embodiments of the present disclosure.

For example, as shown in FIG. 10, a training-target neural network 70 may include at least one convolutional layer 71, a normalization layer 73, an activation layer 75, and the like. The convolutional layer 71 extracts a feature map from input data (e.g., an image or a feature map) through a convolution operation, and the activation layer 75 performs a nonlinear transformation on input data through an activation function. The activation function may include a sigmoid function, the rectified linear unit (ReLU) function, and the like. However, the technical scope of the present disclosure is not limited thereto, and various other activation functions may be included.

According to exemplary embodiments, the training-target neural network 70 may further include a pooling layer, a fully connected layer, and the like. However, the technical scope of the present disclosure is not limited thereto.

As shown in FIG. 10, the normalization layer 73 may be interposed between the convolutional layer 71 and the activation layer 75 and serve to normalize output data (i.e., a feature map) of the convolutional layer 71 and provide the normalized output data as an input to the activation layer 75. However, at least one of the position and number of normalization layers 73 may be variously selected and set according to exemplary embodiments.

Figure 11:
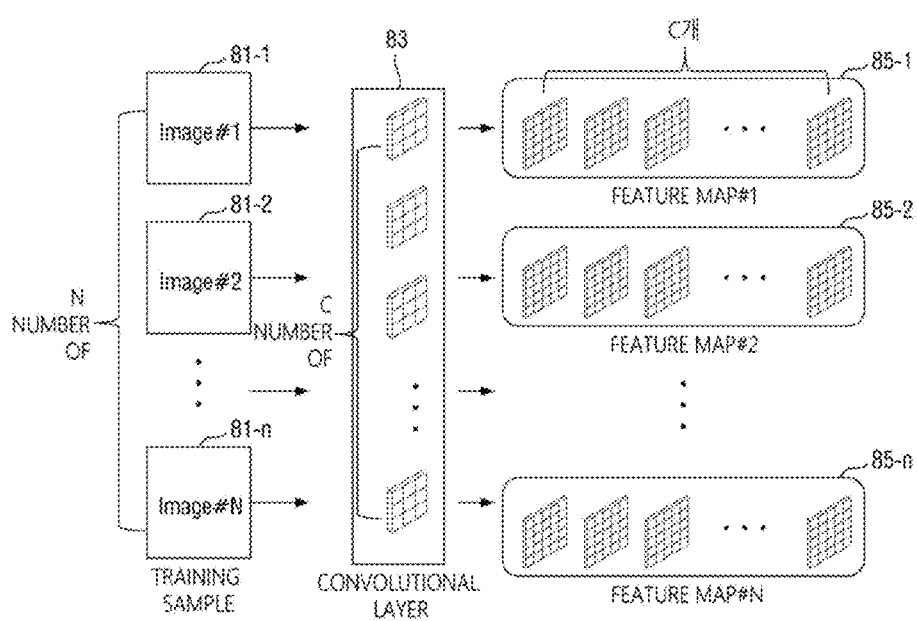
FIGS. 11 and 12 are exemplary diagrams illustrating a method of training a CNN according to some embodiments of the present disclosure.

FIG. 11 shows an example of input data and output data of a convolutional layer 83. In particular, FIG. 11 shows an example in which the convolutional layer 83 carries out a convolution operation through C (C is a natural number greater than or equal to 1) convolutional filters when a batch size is N (N is a natural number greater than or equal to 1).

As shown in FIG. 11, the convolutional layer 83 may receive training samples 81-1 to 81-$n$ belonging to the same batch. Then, the convolutional layer 83 may output feature maps 85-1 to 85-$n$ corresponding to the respective training samples 81-1 to 81-$n$. For example, feature maps 85-1 corresponding to C channels may be extracted from the training sample 81-1. The convolutional layer 83 may receive feature maps as inputs, and the convolutional layer 83 having received the feature maps may output C feature maps through C convolutional filters.

Figure 12:
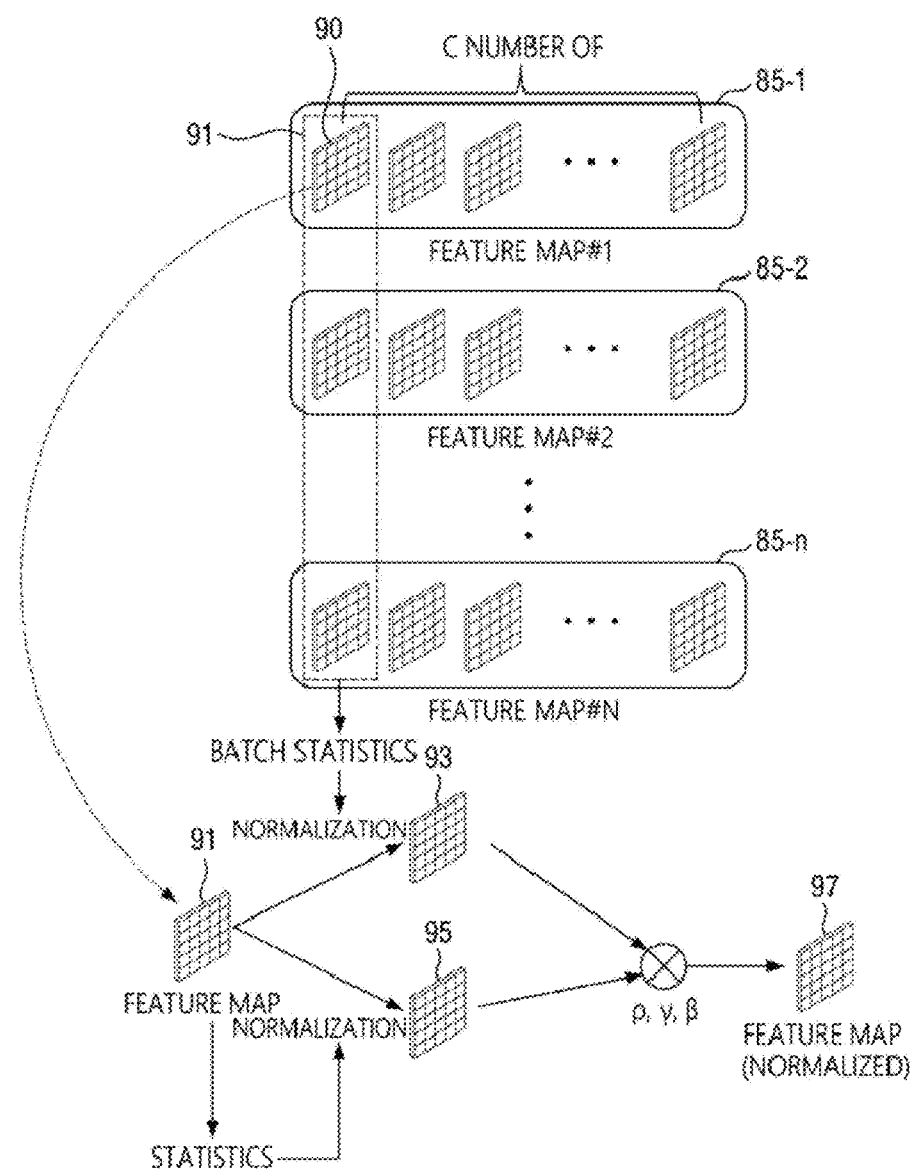

The feature maps 85-1 to 85-$n$ shown in FIG. 11 may be normalized. FIG. 12 shows an example of normalizing first feature maps 91 among feature maps 85-1 related to the training sample 81-1.

As shown in FIG. 12, batch normalization is performed on the first feature maps 91. More specifically, the first feature maps 91 are normalized with statistical information of a batch 90 (i.e., N feature maps) of a first channel to which the first feature maps 91 belong, and the first feature maps 91 are transformed into a first normalized feature map 93 as a result of the normalization. As described above, the statistical information may include a mean and a standard deviation. The batch normalization does not include any affine transformation, but in some other embodiments, an affine transformation may be additionally performed.

The batch normalization may be represented as shown in Equation 2 below.

$$\hat{x}_{nchw}^{(B)} = \frac{x_{nchw} - \mu_c^{(B)}}{\sqrt{\sigma_c^{2(B)} + \epsilon}}, \quad [\text{Equation 2}]$$

$$\mu_c^{(B)} = \frac{1}{NHW} \sum_N \sum_H \sum_W x_{nchw},$$

$$\sigma_c^{2(B)} = \frac{1}{NHW} \sum_N \sum_H \sum_W (x_{nchw} - \mu_c^{(B)})^2$$

In Equation 2, $x_{nchw}^{(B)}$ may be a normalized feature map (e.g., 93) transformed through the batch normalization, and $x_{nchw}$ may be a feature map (e.g., 91) before normalization is performed. c may be an index of a channel, N and n may be indices of batches, and H and h and W and w may indicate spatial locations. μ may be a mean, and σ may be a standard deviation. ε is a parameter for preventing division by 0 and may be set to a very small value.

Next, instance normalization is performed on the first feature maps 91. More specifically, the first feature maps 91 are normalized with statistical information of the first feature maps 91, and the first feature maps 91 are transformed into a second normalized feature map 95 as a result of the normalization. The instance normalization does not include any affine transformation, but in some other embodiments, an affine transformation may be additionally performed.

The instance normalization may be represented as shown in Equation 3 below.

$$\hat{x}_{nchw}^{(I)} = \frac{x_{nchw} - \mu_{nc}^{(I)}}{\sqrt{\sigma_{nc}^{2(I)} + \epsilon}}, \quad [\text{Equation 3}]$$

$$\mu_{nc}^{(I)} = \frac{1}{HW} \sum_H \sum_W x_{nchw},$$

$$\sigma_{nc}^{2(I)} = \frac{1}{HW} \sum_H \sum_W (x_{nchw} - \mu_{nc}^{(I)})^2$$

In Equation 3, $\hat{I}_{nchw}^{(I)}$ may be the normalized feature map (e.g., 95) transformed through the instance normalization, and $x_{nchw}$ may be a feature map (e.g., 91) before normalization is performed. c may be an index of a channel, N and n may be indices of batches, and H and h and W and w may indicate spatial locations. μ may be a mean, and σ may be a standard deviation. ε is a parameter for preventing division by 0 and may be set to a very small value.

Next, the first normalized feature map 93 and the second normalized feature map 95 are aggregated into a third normalized feature map (not shown), and when an affine transformation is performed on the third normalization feature map, a target normalized feature map 97 may be generated regarding the first feature maps 91. Such a process may be performed based on learnable normalization parameters ρ, γ, and β as described above. In other words, the target normalized feature map 97 is forwarded to a next layer (e.g., the activation layer 75) to calculate a prediction error, and the prediction error is backpropagated. Then, values of the normalization parameters ρ, γ, and β may be updated together with other weights of the neural network 70. In this way, values of the normalization parameters ρ, γ, and β are adjusted according to the relationship between style information of the training samples and a target task. For example, when the style information of the training samples is important for performing the target task, the value of the normalization parameter ρ may be adjusted so that batch normalization may be mainly used.

Like the feature maps 91 belonging to the first channel, feature maps belonging to a second channel may be normalized. For example, batch normalization may be performed on the second feature maps belonging to the second channel using statistical information of a batch related to the second channel, and instance normalization may be performed with statistical information of the second feature maps. The two kinds of normalization results may be aggregated based on the normalization parameter ρ.

Meanwhile, according to various embodiments of the present disclosure, the normalization parameter p may be defined in various ways.

Figure 13:
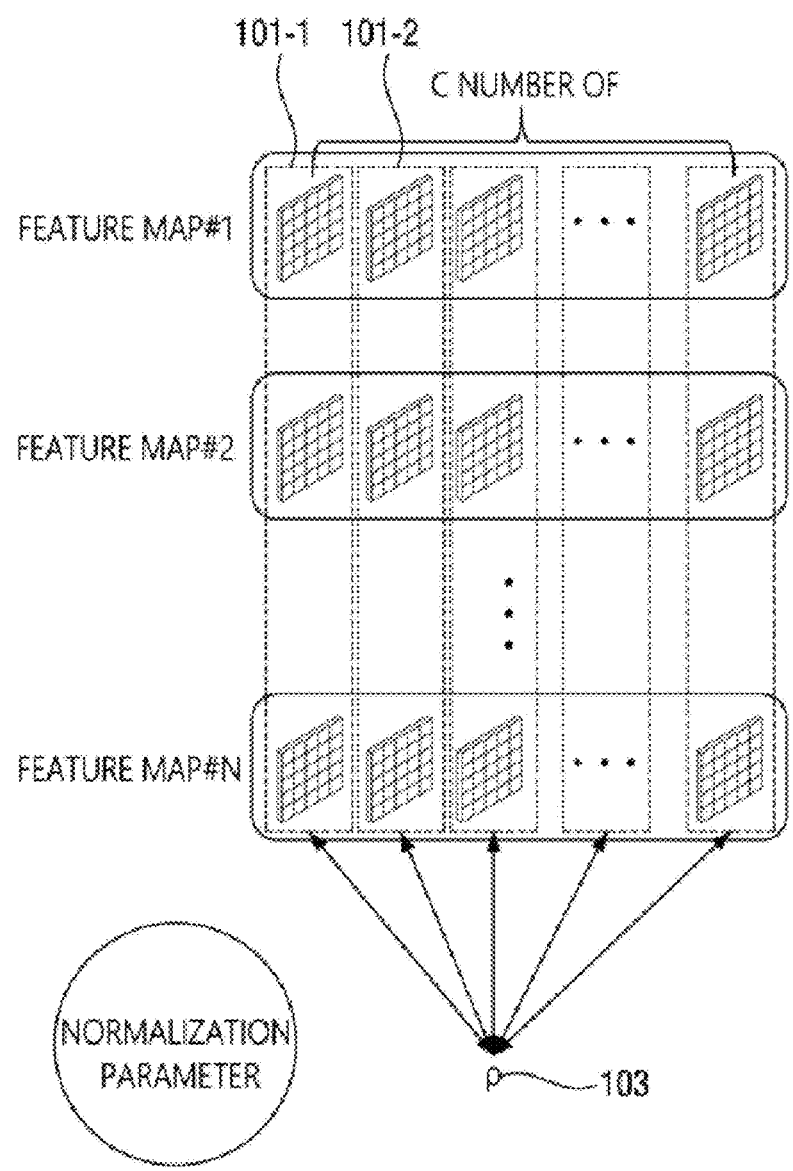
FIGS. 13 and 14 are exemplary diagrams illustrating a method of setting a normalization parameter according to some embodiments of the present disclosure

As an example, the normalization parameter ρ may be defined as one scalar value per layer or may be defined as one value for every plurality of channels. More specifically, as shown in FIG. 13, feature maps 101-1 of a batch related to the first channel and feature maps 101-2 of a batch related to the second channel may be normalized based on a single normalization parameter 103. Although FIG. 13 shows an example in which all channels (i.e., feature maps 101-1 to 101-*c* of all batches) share the single normalization parameter 103, only some channels may share a normalization parameter.

Figure 14:
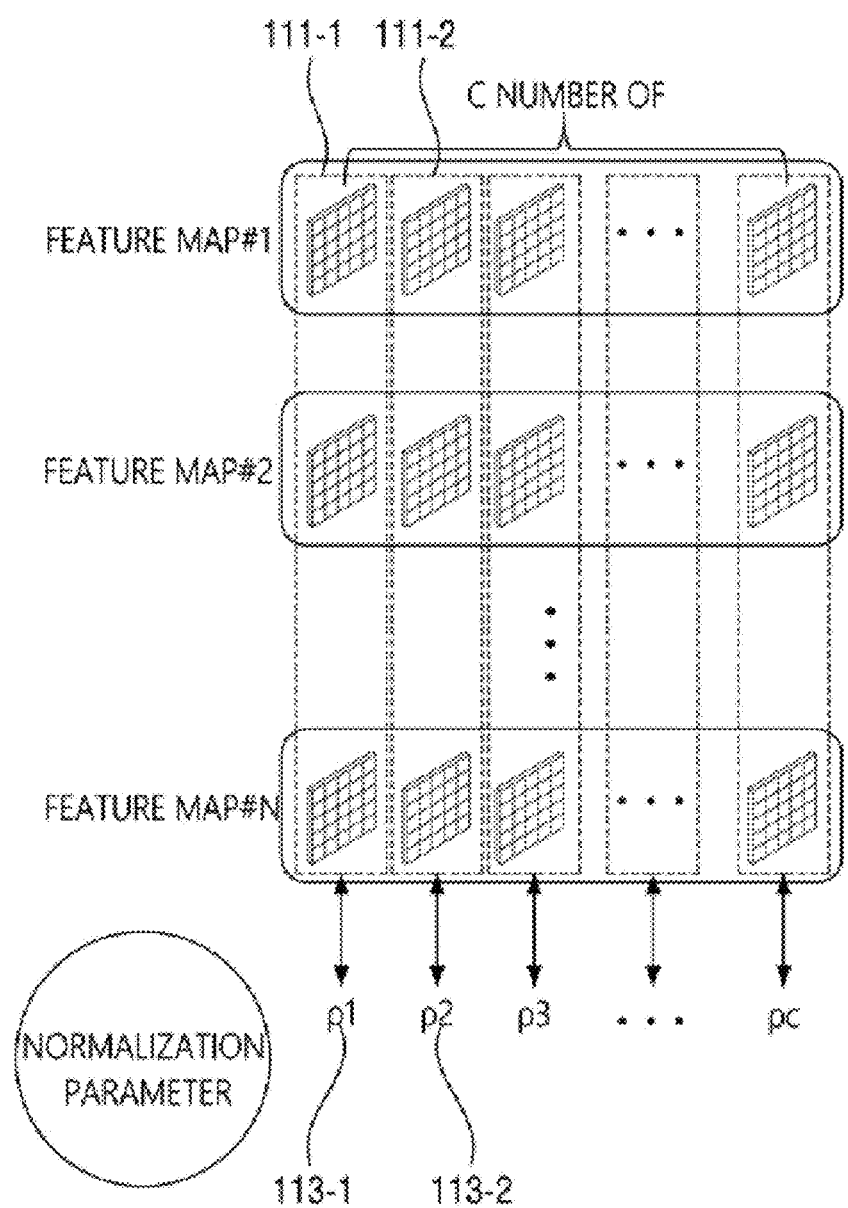

As another example, the normalization parameter ρ may be defined as one value per channel. More specifically, as shown in FIG. 14, feature maps 111-1 of a batch related to a first channel may be normalized based on a first normalization parameter 113-1, and feature maps 111-2 of a batch related to a second channel may be normalized based on a second normalization parameter 113-2. In other words, normalization parameters may be set and learned separately for respective channels. In this case, usage rates of normalization techniques may be adjusted depending on the channels, and accordingly, more precise normalization may be performed in further detail.

Examples in which the technical idea of the present disclosure has been implemented in a CNN have been described in detail above with reference to FIGS. 10 to 14. According to the above descriptions, normalization may be adaptively performed according to style information contained in an image and a target task. As a result, performance of a neural network may be remarkably improved. Experimental results of CNN performance will be described below with reference to FIGS. 17 and 18.

A method of training a neural network according to some other embodiments of the present disclosure is described below with reference to FIGS. 17 and 18. This exemplary embodiment may be considered to be a method obtained by generalizing the above described method of training a neural network. In the following description of this exemplary embodiment, descriptions identical or similar to those of the above-described exemplary embodiments are omitted.

Figure 15:
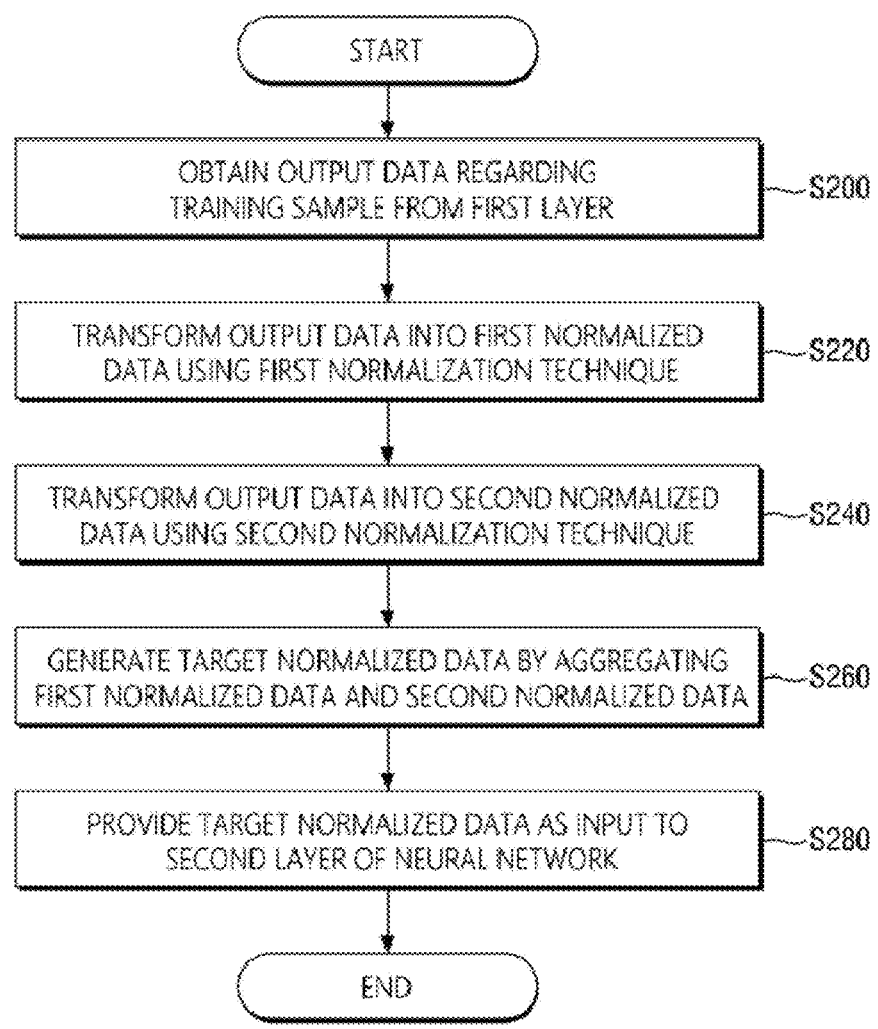
FIG. 15 is an exemplary flowchart illustrating a method of training a neural network according to some other embodiments of the present disclosure.

FIG. 15 is an exemplary flowchart illustrating a method of training a neural network according to some other embodiments of the present disclosure. The flowchart merely corresponds to an exemplary embodiment for achieving an object of the present disclosure, and some operations may be added or removed as necessary.

As shown in FIG. 15, the method of training a neural network begins with operation S200 of acquiring output data regarding training samples from a first layer of a neural network. For example, when the first layer is a CNN, the output data may be feature maps.

In operation S220, the output data is transformed into first normalized data using a first normalization technique.

In operation S240, the output data is transformed into second normalized data using a second normalization technique.

According to various embodiments of the present disclosure, the first normalization technique and the second normalization technique may include various normalization techniques such as batch normalization, instance normalization, group normalization, and layer normalization. However, the first and second normalization techniques are not limited thereto and may further include other normalization techniques.

In some embodiments, the first normalization technique may be a technique for normalizing the output data by using statistical information of a batch to which the training samples belong (i.e., the batch normalization technique), and the second normalization technique may be a technique for normalizing the output data by using statistical information of the output data (i.e., the instance normalization technique).

In some other embodiments, the neural network may be based on a CNN, and the output data may include a plurality of feature maps corresponding to each channel. Also, the first normalization technique may be the batch normalization technique, and the second normalization technique may be a technique for normalizing a specific feature map among a plurality of feature maps by using statistical information of a group to which the specific feature map belongs (i.e., a group normalization technique). When the group normalization technique is applied, the neural network may be stably trained even with a small batch size. For example, in the case of a large batch size, the neural network may be stably trained with the batch normalization technique, and even in the case of a small batch size, it is possible to ensure stability of the training using the group normalization technique.

Figure 16:
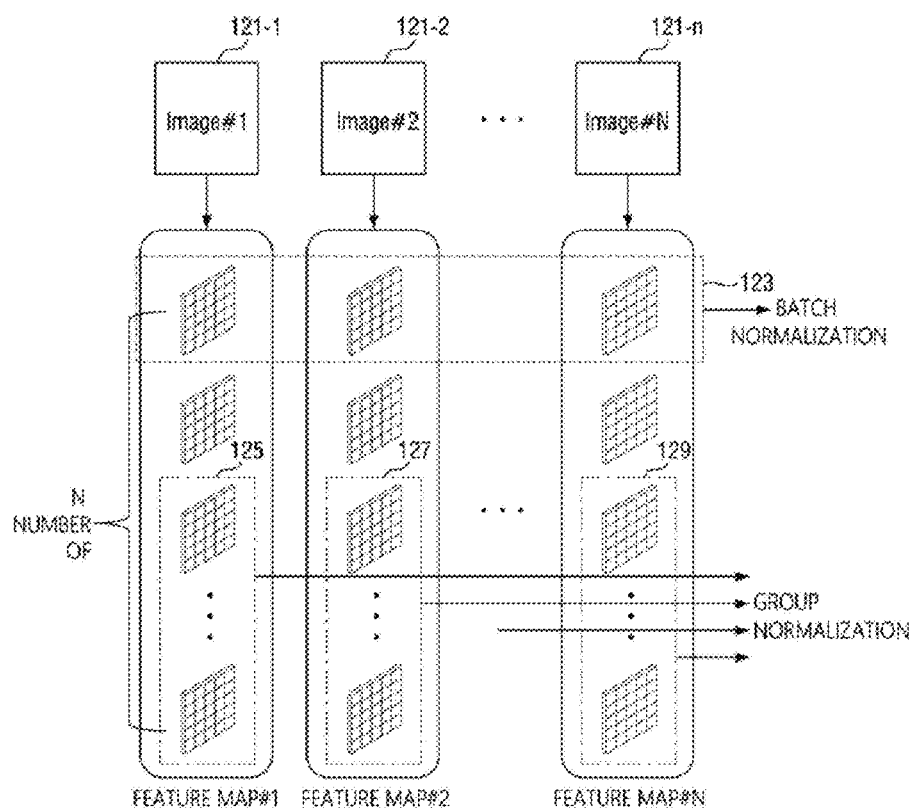
FIG. 16 is an exemplary diagram illustrating a difference between the batch normalization technique and a group normalization technique that may be referred to in various embodiments of the present disclosure.

A difference between the group normalization technique and the batch normalization technique is illustrated in FIG. 16. FIG. 16 shows an example in which a batch size is N and first to $n^{th}$ training samples 121-1 to 121-*n* belong to one batch. As shown in FIG. 16, according to the batch normalization technique, channel-specific normalization may be performed with statistical information of a batch. For example, according to the batch normalization technique, each feature map belonging to a batch 123 related to a first channel may be normalized with statistical information of the batch 123. On the other hand, the group normalization technique is a technique for normalizing each specific group (e.g., 125, 127, and 129) using statistical information of the specific groups (e.g., 125, 127, and 129) among all of C channels. Each of the groups (e.g., 125, 127, and 129) may be associated with one training sample (e.g., 121-1, 121-2, or 121-*n*). When groups are set to include all channels, the group normalization technique may involve the same operation as the layer normalization technique. Since those of ordinary skill in the art will clearly understand the group normalization technique, detailed description of the group normalization technique is omitted.

In some other embodiments, the neural network may be based on a CNN, and the output data may include a plurality of feature maps corresponding to each channel. Also, the first normalization technique may be the group normalization technique, and the second normalization technique may be the instance normalization technique.

In some other embodiments, the batch normalization technique, the instance normalization technique, and the group normalization technique (or the layer normalization technique) may be used together. In this case, the output data may be transformed by each of the normalization techniques, and transformed data may be aggregated to generate target normalized data. According to this exemplary embodiment, it is possible to simultaneously adjust the stability of neural network training and the amount of style information. For example, in the case of a large batch size, the neural network may be stably trained with the batch normalization technique, and even in the case of a small batch size, it is possible to ensure stability of the training using the group normalization technique. Also, the amount of style information may be automatically adjusted with the instance normalization technique. For example, when a target task does not require style information, a parameter for adjusting a usage rate of instance normalization may be learned as a value close to 1 such that style information may be barely used for neural network training.

In operation S260, the first normalized data and the second normalized data are aggregated to generate target normalized data. Operation S260 has been described in detail above with reference to FIGS. 7 and 8.

In operation S280, the target normalized data is provided as an input to a second layer. Then, the target normalized data is forwarded through the second layer such that prediction values of the neural network may be output regarding the training samples. Also, errors between the prediction values and correct answers to the training samples are backpropagated such that weights of the neural network may be updated. A normalization parameter may also be updated together with the weights.

The exemplary embodiments have been described on the assumption that two normalization techniques are used. However, in some other embodiments, three or more normalization techniques may be used simultaneously.

The method of training a neural network according to some other embodiments of the present disclosure has been described above with reference to FIGS. 15 and 16. According to the above-described method, various normalization techniques may be combined based on a learnable parameter. In other words, according to the technical scope of the present disclosure, different normalization techniques may be applied through the learnable parameter p adaptively according to a target task. For example, the batch normalization technique and the instance normalization technique which are different normalization techniques may be applied through the learnable parameter p adaptively according to a target task. For this reason, it is possible to provide a universal normalization technique which may be applied to various domains and target tasks.

Experimental results regarding a normalization technique proposed in the present disclosure are briefly described below with reference to FIGS. 17 and 18. In FIGS. 17 and 18, "BIN" indicates a case in which the batch normalization technique and the instance normalization technique are simultaneously used through the proposed normalization technique, "BN" indicates a case in which the batch normalization technique is used, and "IN" indicates a case in which the instance normalization technique is used. Also, "BN+IN" indicates a case in which the batch normalization technique and the instance normalization technique are separately performed.

Figure 17:
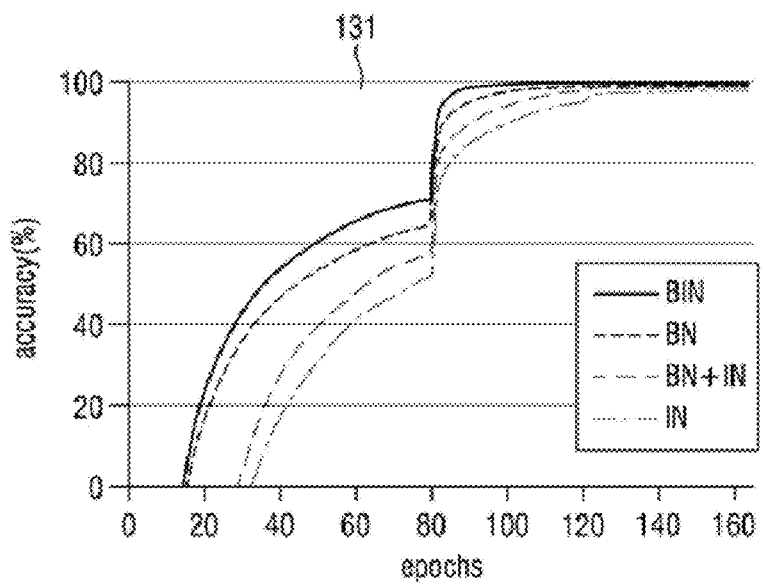
FIGS. 17 and 18 show experimental results regarding a proposed normalization technique.
Figure 17:
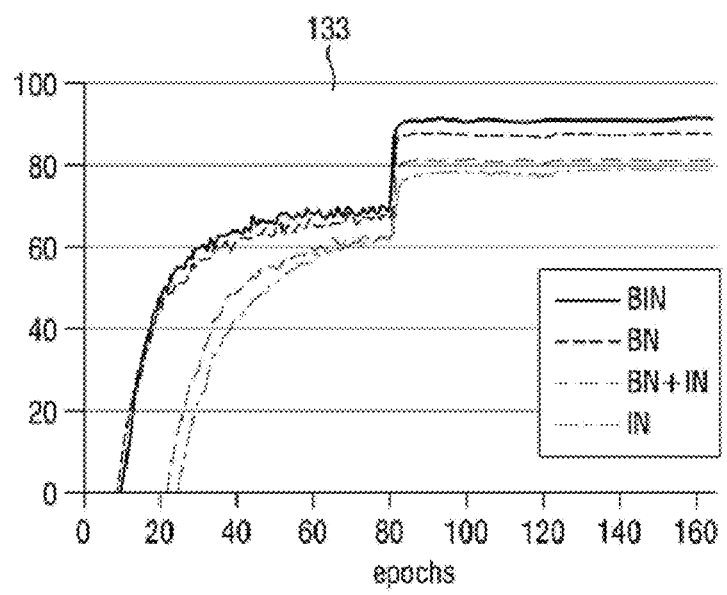

First, FIG. 17 shows performance evaluation results regarding a neural network which performs a general object recognition task. A graph 131 on the upper side shows accuracy evaluated with training data sets, and a graph 133 on the lower side shows accuracy evaluated with test data sets. The Canadian Institute for Advanced Research (CI-FAR)-100 data set was used to train and evaluate the neural network.

Referring to FIG. 17, it is possible to see that the proposed technique "BIN" and the batch normalization technique "BN" showed the two highest accuracies. This denotes that it was appropriate to train the neural network, which performed the object recognition task, using the batch normalization technique "BN" and according to the proposed technique "BIN," the object recognition task and style information contained in an image set were taken into consideration to intelligently perform normalization mainly based on the batch normalization technique.

Figure 18:
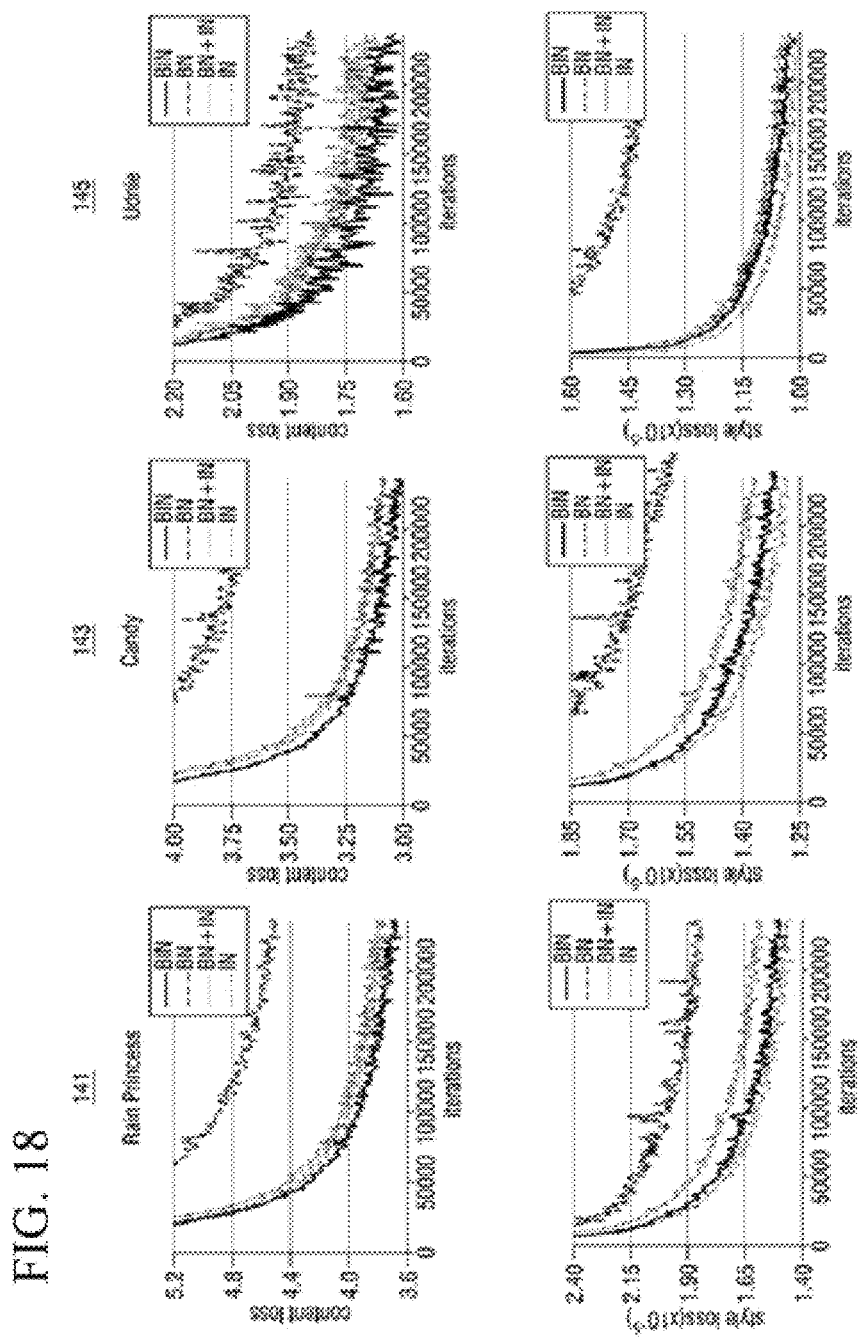

Next, FIG. 18 shows performance evaluation results regarding a neural network which performs a style transfer task. Respective graphs 141, 143, and 145 show the degrees of loss evaluated with data sets of different domains. Upper graphs show content loss, and lower graphs show style loss. An Office-Home dataset was used to train and evaluate the neural network.

In this technical field, a style transfer task is well known as a task not requiring style information. Due to this characteristic, the instance normalization technique is mainly used for a style transfer task. The graphs 141, 143, and 145 of FIG. 18 show characteristics of a style transfer task. It is possible to see that the batch normalization technique showed the largest content loss and style loss and the instance normalization technique showed the smallest content loss and style loss.

Also, it is possible to see that the proposed technique "BIN" showed content loss and style loss similar to those of the instance normalization technique "IN" regardless of domains. This denotes that, according to the proposed technique "BIN," the characteristics of a style transfer task were taken into consideration to intelligently perform normalization mainly based on the instance normalization technique.

Referring to the experimental results shown in FIGS. 17 and 18, it is possible to see that the technique "BIN" proposed in the present disclosure involves adaptively (or intelligently) adjusting a usage rate of a normalization technique by considering style information contained in an image set and characteristics of a target task. Also, it is possible to see that the proposed technique "BIN" may be universally used not only by considering style information and a target task but also regardless of domain.

Experimental results regarding the proposed normalization technique have been described above with reference to FIGS. 17 and 18. An exemplary computing device 200 for implementing an apparatus for training a neural network (e.g., the training apparatus 30 of FIG. 4) according to various embodiments of the present disclosure is described below with reference to FIG. 19.

FIG. 19 shows an exemplary hardware block diagram of a computing device 200.

As shown in FIG. 19, the computing device 200 may include one or more processors 210, a bus 250, a communication interface 270, a memory 230 to which a computer program 291 executed by the processor 210 is loaded, and a storage 290 which stores the computer program 291. However, FIG. 19 shows only elements related to embodiments of the present disclosure. Therefore, those of ordinary skill in the art will see that general elements other than those shown in FIG. 19 may be further included. In other words, various elements other than those shown in FIG. 19 may be further included in the computing device 200.

The processor 210 controls overall operation of each element of the computing device 200. The processor 210 may be configured to include at least one of a central processing unit (CPU), a microprocessor unit (MPU), a microcontroller unit (MCU), a graphics processing unit (GPU), and any form of processor well known in the technical field of the present disclosure. The processor 210 may perform calculation of at least one application or program for executing methods or operations according to embodiments of the present disclosure. The computing device 200 may include one or more processors.

The memory 230 stores various kinds of data, commands, and/or information. To execute methods or operations according to various embodiments of the present disclosure, the memory 230 may load one or more programs 291 from the storage 290. The memory 230 may be implemented as a volatile memory such as a random access memory (RAM), but the technical scope of the present disclosure is not limited thereto.

The bus 250 provides a communication function between elements of the computing device 200. The bus 250 may be implemented as various forms of buses, such as an address bus, a data bus, and a control bus.

The communication interface 270 supports wired and wireless Internet communication of the computing device 200. Also, the communication interface 270 may support various communication methods as well as Internet communication. To this end, the communication interface 270 may include a communication module well known in the technical field of the present disclosure. In some cases, the communication interface 270 may be omitted.

The storage 290 may non-temporarily store the one or more programs 291. The storage 290 may include a non-volatile memory, such as a read only memory (ROM), an erasable programmable ROM (EPROM), an electrically erasable programmable ROM (EEPROM), and a flash memory, a hard disk, a removable disk, or any form of computer-readable recording medium well known in the art to which the present disclosure pertains.

The computer program 291 may include one or more instructions which cause the processor 210 to perform methods or operations according to various embodiments of the present disclosure when loaded to the memory 230. In other words, the processor 210 may execute methods according to various embodiments of the present disclosure by performing the one or more instructions. Also, the above-described various embodiments may be implemented when the processor 210 executes one or more instructions.

As an example, the computer program 291 may include instructions to perform an operation of obtaining output data of a first layer of a neural network regarding a training sample, an operation of transforming the output data into first normalized data using statistical information of a batch to which the training sample belongs, an operation of transforming the output data into second normalized data using statistical information of the output data, an operation of generating target normalized data by aggregating the first normalized data and the second normalized data based on a learnable parameter, and an operation of providing the target normalized data as an input to a second layer of the neural network. In this case, an apparatus for training a neural network (e.g., 30) according to some embodiments of the present disclosure may be implemented through the computing device 200.

As another example, the computer program 291 may include instructions to perform an operation of obtaining output data of a first layer of a neural network regarding a training sample, an operation of transforming the output data into first normalized data using a first normalization technique, an operation of transforming the output data into second normalized data using a second normalization technique, an operation of generating target normalized data by aggregating the first normalized data and the second normalized data based on a learnable parameter, and an operation of providing the target normalized data as an input to a second layer of the neural network. In this case, an apparatus for training a neural network (e.g., 30) according to some other embodiments of the present disclosure may be implemented through the computing device 200.

Various exemplary embodiments of the present disclosure and effects thereof have been described above with reference to FIGS. 1 to 19. Effects of the present disclosure are not limited to those mentioned above, and other effects which have not been mentioned can be clearly understood by those of ordinary skill in the art from the following description.

The concepts of the disclosure described above with reference to FIGS. 1 to 19 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A method of training a neural network in a computing device, the method comprising:
   obtaining output data of a first layer of the neural network regarding a training sample;
   transforming the output data into first normalized data using a first normalization technique;
   transforming the output data into second normalized data using a second normalization technique different from the first normalization technique;
   increasing a first application rate of the first normalized data and decreasing a second application rate of the second normalized data by using a learnable parameter, or decreasing the first application rate and increasing the second application rate by using the learnable parameter, and generating third normalized data by adding the first normalized data multiplied by the first application rate and the second normalized data multiplied by the second application rate;
   providing the third normalized data as an input to a second layer of the neural network to calculate a prediction error associated with the training sample; and
   training the neural network, wherein the training comprises backpropagating the prediction error to update a weight of the neural network and the learnable parameter,
   wherein the first normalization technique includes batch normalization for normalizing the output data by using statistical information of a batch to which the training sample belongs, and
   wherein the second normalization technique includes instance normalization for normalizing the output data by using statistical information of the output data.

2. The method of claim 1, wherein the learnable parameter includes a first parameter and a second parameter,
  wherein the first application rate is adjusted by the first parameter, and
  wherein the second application rate is adjusted by the second parameter.

3. The method of claim 1, wherein the generating the third normalized data comprises:
  adding the first normalized data multiplied by the first application rate and the second normalized data multiplied by the second application rate; and
  generating the third normalized data by performing an affine transformation on the added normalized data based on a learnable affine parameter, and
  wherein backpropagating the prediction error further includes backpropagating the prediction error to update the learnable affine parameter.

4. The method of claim 1, wherein the neural network is based on a convolutional neural network, and
  wherein the output data is a feature map.

5. The method of claim 4, wherein the output data includes a first feature map associated with a first channel and a second feature map associated with a second channel, and
  wherein the generating the third normalized data comprises:
    generating $3^{rd}$-1 normalized data regarding the first channel using normalized data associated with the first feature map; and
    generating $3^{rd}$-2 normalized data regarding the second channel using normalized data associated with the second feature map.

6. The method of claim 5, wherein the learnable parameter includes a first parameter and a second parameter,
  wherein the normalized data associated with the first feature map includes a first normalized feature map which has been normalized with statistical information of a batch associated with the first channel,
  wherein the normalized data associated with the second feature map includes a second normalized feature map which has been normalized with statistical information of a batch associated with the second channel,
  wherein an application rate at which the first normalized feature map is applied to the $3^{rd}$-1 normalized data is adjusted by the first parameter, and
  wherein an application rate at which the second normalized feature map is applied to the $3^{rd}$-2 normalized data is adjusted by the second parameter.

7. The method of claim 5, wherein the normalized data associated with the first feature map includes a first normalized feature map which has been normalized with statistical information of a batch associated with the first channel,
  wherein the normalized data associated with the second feature map includes a second normalized feature map which has been normalized with statistical information of a batch associated with the second channel, and
  wherein both a rate at which the first normalized feature map is applied to the $3^{rd}$-1 normalized data and a rate at which the second normalized feature map is applied to the $3^{rd}$-2 normalized data are adjusted by the learnable parameter.

8. The method of claim 4, wherein statistical information of the output data includes a mean and a standard deviation of a plurality of feature values included in the feature map.

9. The method of claim 4, wherein the first layer extracts the feature map through a convolution operation, and
  wherein the second layer performs a nonlinear transformation on input data through an activation function.

10. The method of claim 1, wherein at least one of an initial value of the learnable parameter and a size of the batch is determined based on a target task of the neural network.

11. The method of claim 1, wherein the neural network is based on a convolutional neural network,
  wherein the output data includes a plurality of feature maps corresponding to respective channels.

12. The method of claim 1, further comprising transforming the output data into fourth normalized data using a third normalization technique, wherein the generating of the third normalized data comprises adjusting a third application rate of the fourth normalized data based on the learnable parameter, and generating the third normalized data by further adding the fourth normalized data to which the third application rate has been applied to the first normalized data multiplied by the first application rate and the second normalized data multiplied by the second application rate, and
  wherein the third normalization technique includes instance normalization for normalizing the output data by using statistical information of the output data.

13. An apparatus for training a neural network, the apparatus comprising:
  a memory configured to store one or more instructions; and
  a processor configured to, by executing the stored one or more instructions,
  obtain output data of a first layer of the neural network regarding a training sample,
  transform the output data into first normalized data using a first normalization technique,
  transform the output data into second normalized data using a second normalization technique different from the first normalization technique,
  increase a first application rate of the first normalized data and decrease a second application rate of the second normalized data by using a learnable parameter, or decrease the first application rate and increase the second application rate by using the learnable parameter, and add the first normalized data multiplied by the first application rate and the second normalized data multiplied by the second application rate to generate third normalized data,
  provide the third normalized data as an input to a second layer of the neural network to calculate a prediction error associated with the training sample, and
  update a weight of the neural network and the learnable parameter by training the neural network, wherein the training comprises backpropagating the prediction error,
  wherein the first normalization technique includes batch normalization for normalizing the output data by using statistical information of a batch to which the training sample belongs, and
  wherein the second normalization technique includes instance normalization for normalizing the output data by using statistical information of the output data.

14. The apparatus of claim 13, wherein the neural network is based on a convolutional neural network,
  wherein the output data includes a plurality of feature maps corresponding to respective channels.

15. The apparatus of claim 13, wherein the processor is configured to generate the third normalized data by adding the first normalized data multiplied by the first application rate and the second normalized data multiplied by the second application rate and performing an affine transformation on the added normalized data based on a learnable affine parameter, and updates the learnable affine parameter by backpropagating the prediction error.

\* \* \* \* \*